July 19, 1932.  G. S. HELENBOLT  1,868,356
FRUIT SIZING MACHINE
Filed June 28, 1929    6 Sheets-Sheet 1

George S. Helenbolt, Inventor.

Witness:
J. J. Oberst.

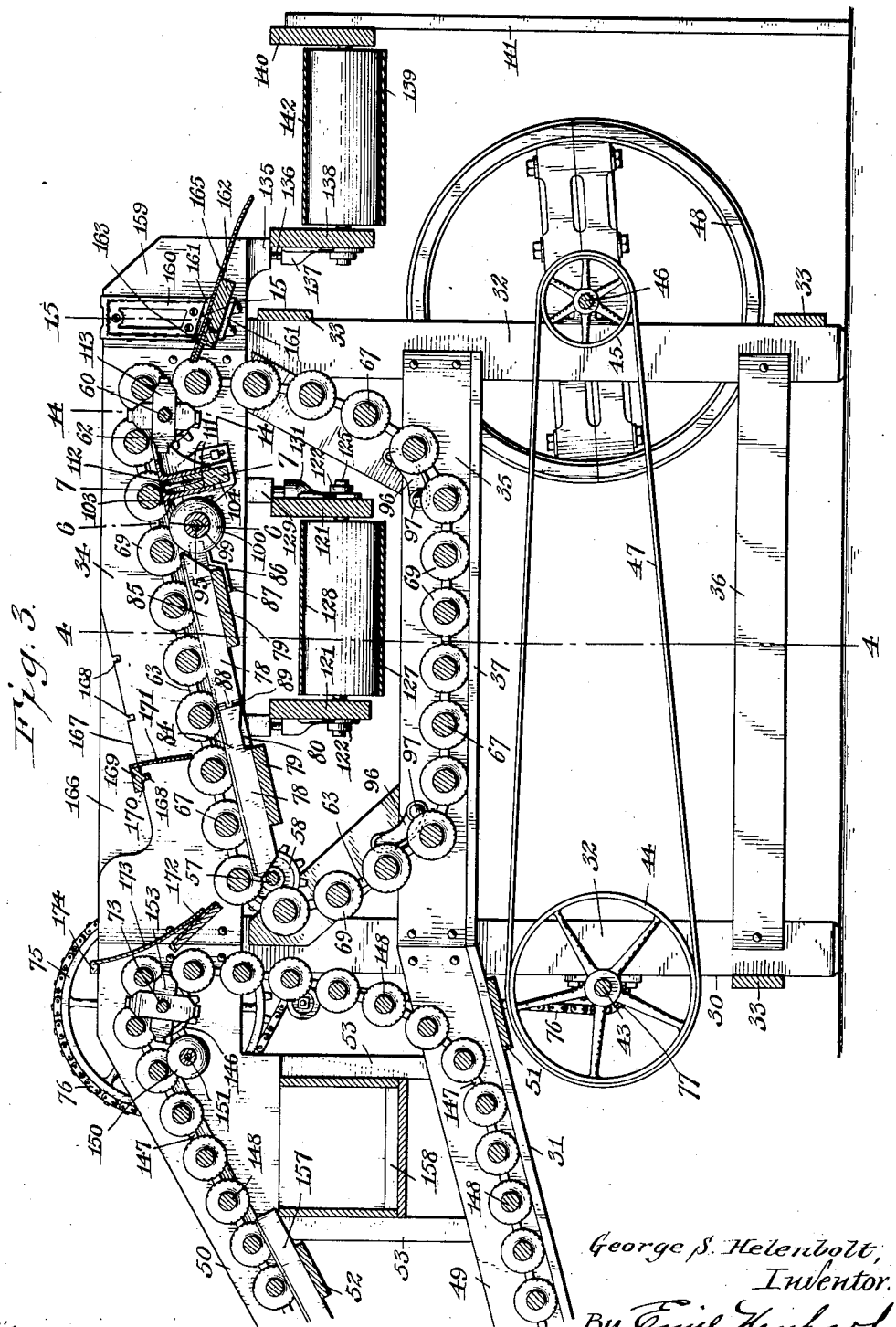

July 19, 1932.  G. S. HELENBOLT  1,868,356
FRUIT SIZING MACHINE
Filed June 28, 1929  6 Sheets-Sheet 3
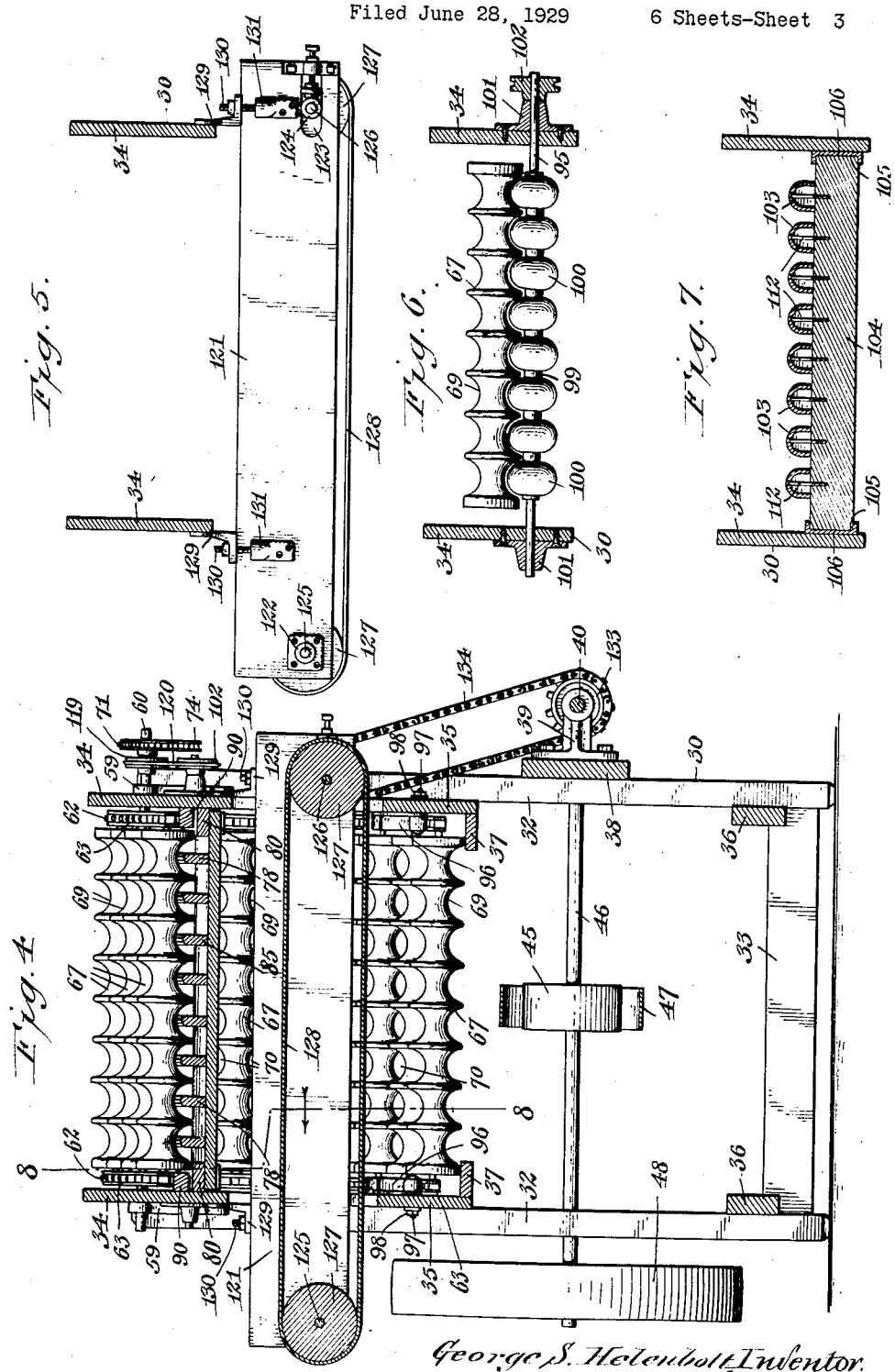

July 19, 1932.  G. S. HELENBOLT  1,868,356
FRUIT SIZING MACHINE
Filed June 28, 1929   6 Sheets-Sheet 4
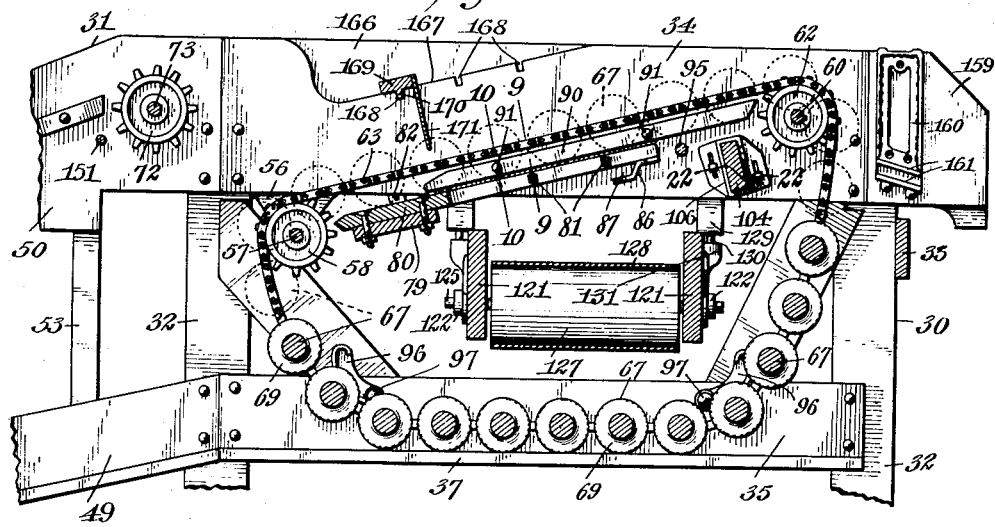
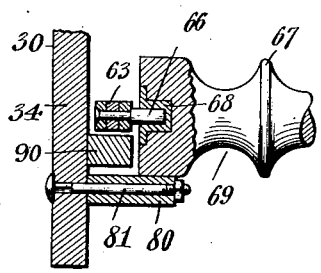
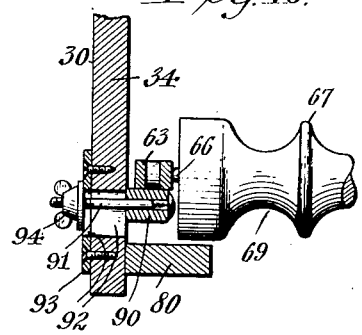
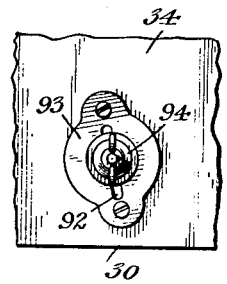
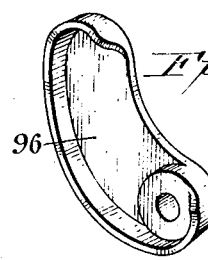
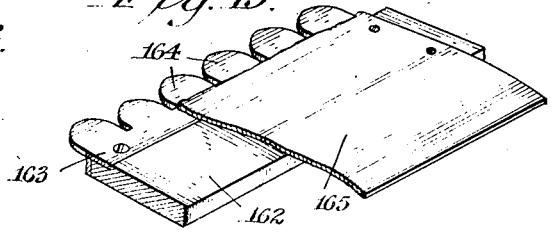
George S. Helenbolt, Inventor.
Witness:
J. J. Oberst,
By Emil Kurhart
Attorney.

July 19, 1932. G. S. HELENBOLT 1,868,356
FRUIT SIZING MACHINE
Filed June 28, 1929 6 Sheets-Sheet 5
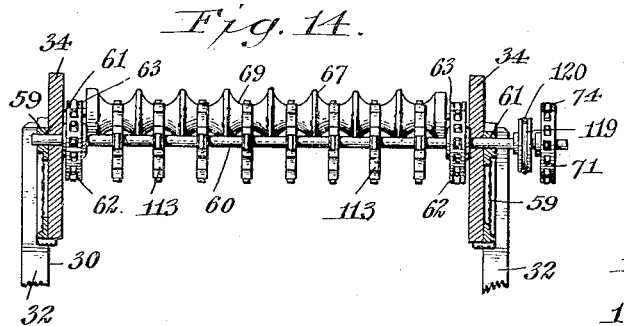
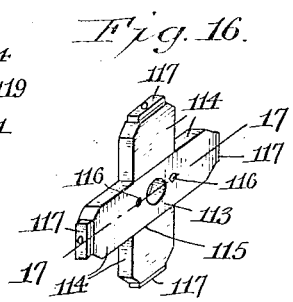
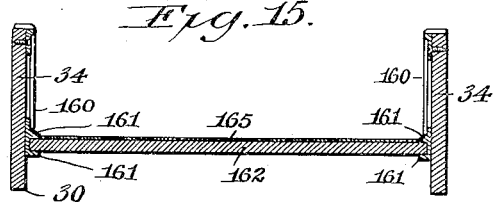
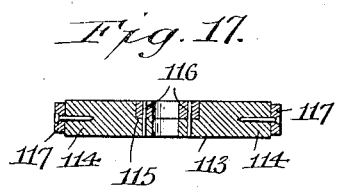
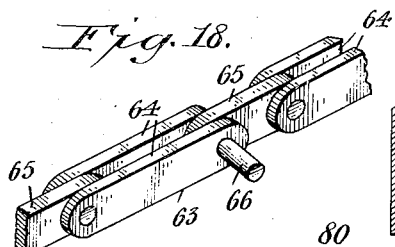
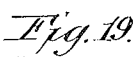
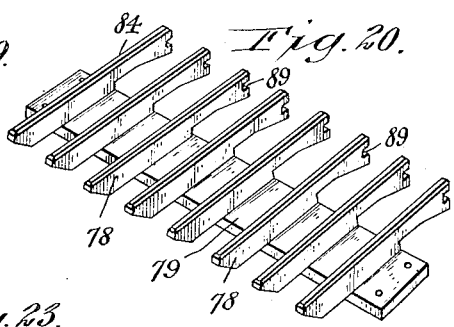
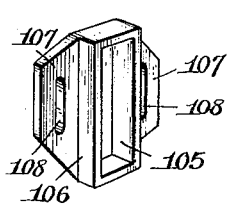
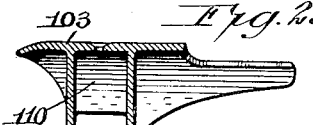
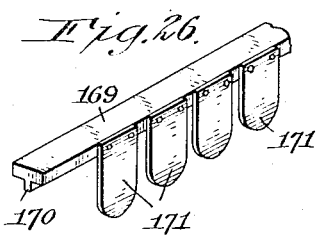
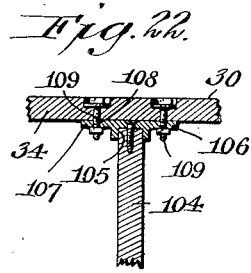
George S. Helenbolt,
Inventor.
By Emil Kenhart
Attorney.
Witness:
J. J. Oberst, July 19, 1932. G. S. HELENBOLT 1,868,356
FRUIT SIZING MACHINE
Filed June 28, 1929 6 Sheets-Sheet 6
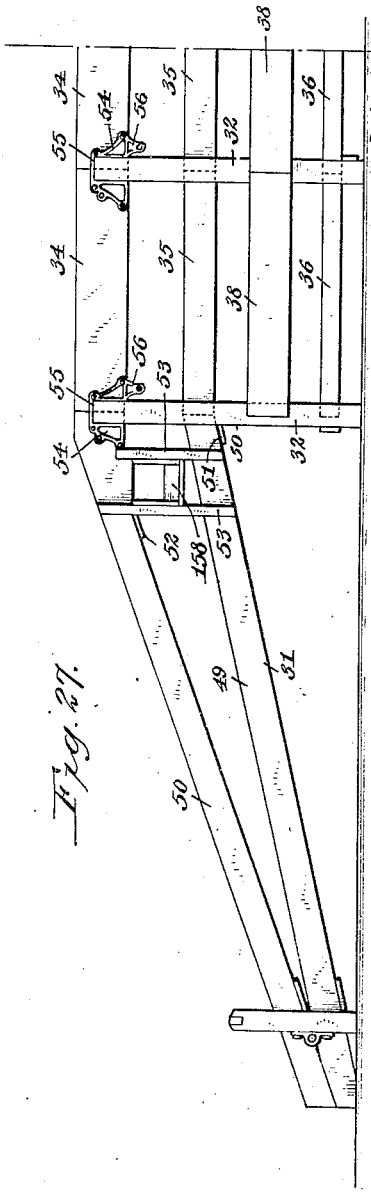
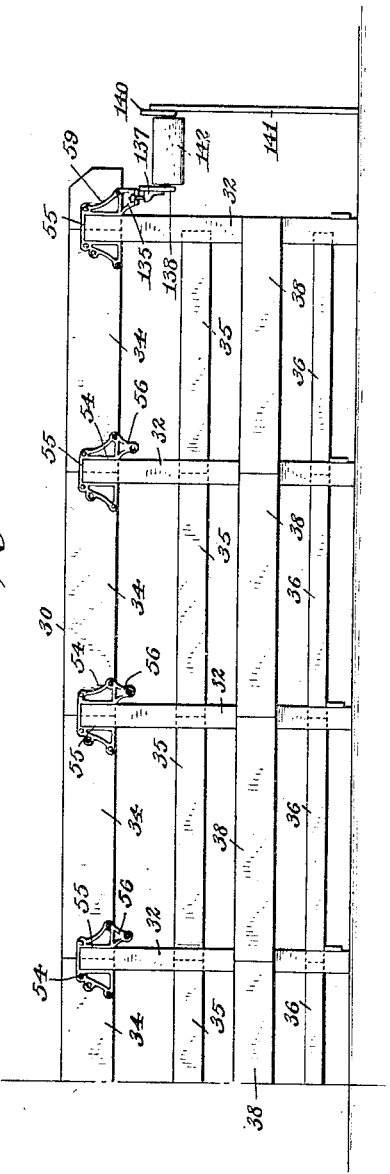
George S. Helenbolt, Inventor.
Witness:
J. J. Oberst Patented July 19, 1932

1,868,356

UNITED STATES PATENT OFFICE

GEORGE S. HELENBOLT, OF MIDDLEPORT, NEW YORK, ASSIGNOR TO NIAGARA SPRAYER AND CHEMICAL CO., INC., OF MIDDLEPORT, NEW YORK, A CORPORATION OF NEW YORK

FRUIT SIZING MACHINE

Application filed June 28, 1929. Serial No. 374,354.

My invention relates to improvements in fruit sizing machines.

The invention has for one of its objects the provision of a machine which will prevent more than a single layer of fruit passing through the machine at a time.

Another object of my invention is to provide a sizing machine which can be used as a single sizing unit, or which may consist of a number of sizing units, depending on the number of sizes into which the fruit is to be separated.

Another object of my invention is to provide a sizing machine, comprising fruit feeding mechanism, and sizing mechanism consisting of one or more units, each unit being associated with delivery mechanism for sized fruit; and to so construct the fruit feeding mechanism and the sizing unit or units that they can be easily connected together so that a single sizing unit, or any number of sizing units can be employed in connection with fruit feeding mechanism.

Another object of my invention is to provide novel means applicable to or removable from the machine, or any unit of the machine, to compel the fruit to pass through a sizing unit without being sized or to permit the fruit to be sized, as may be desired.

Another object of my invention is to provide a sizing machine in which a number of sizing units may be employed for successive action, each unit being designed to size out fruit of a different size than the remaining units and each unit being so constructed that it may be converted from a sizing unit into a fruit-conveying unit when the particular size of fruit it is designed to size is not desired as a separate grade or lot.

Another object of my invention is to provide a machine with an endless series of rotating sizing elements, and means for causing said sizing elements to rotate when traveling through an endless course, or to travel through said endless course without rotating.

A further object of my invention is the provision of a sizing machine equipped with sizing rollers, between which sizing spaces or openings of a definite size are formed, and with which is associated novel means to prevent the passage of fruit through said sizing spaces or openings until the sizing rollers travel through a limited region in their course of travel.

A further object of my invention is the provision of a sizing machine, each including a sizing member traveling along a predetermined course and having sizing openings therein, said sizing member being associated with sectional means, partly removable from the unit to prevent the passage of fruit through said sizing openings at any point along the course of travel of said sizing member, or to permit the passage of fruit through said sizing member only along a restricted region in the course of travel of said sizing member.

A further object of my invention is the provision of a sizing machine having rotatable sizing elements provided with sizing spaces between them, and means associated therewith to prevent the fruit lodging within the sizing spaces between said elements.

A still further object of my invention is the provision of mechanism for feeding fruit to be sized to the sizing mechanism of the machine and at the same time separate or eliminate the culls or small size fruit before feeding the fruit onto the sizing mechanism, said feeding mechanism having means associated therewith to prevent lodgment in the feeding mechanism of any of the fruit to be delivered thereby to the sizing mechanism.

A still further object of my invention is the provision of a sizing member having sizing openings therein, and means to release any fruit retained within any of said sizing openings and cause such fruit to be carried along with the sizing member.

A still further object of my invention is the provision of new and novel means for preventing more than a single layer of fruit from being carried along with the traveling sizing member.

With the above and other objects to appear hereinafter, my invention consists in the novel devices; in the novel features of construction; and in the combination and arrangement of parts to be hereinafter described and more particularly pointed out in the subjoined claims.

In the drawings:—

Fig. 3 is an enlarged longitudinal section through the sizing mechanism or unit and the adjacent end of the feeding mechanism detachably connected therewith.

Fig. 4 is a transverse section taken on line 4—4, Fig. 3.

Fig. 5 is a side elevation of the laterally-discharging fruit-delivery device for delivering sized fruit out of the machine, said device being shown in connection with the upper side boards of the frame of the sizing machine and the means provided for suspending said device from said side boards.

Fig. 6 is a transverse section taken on line 6—6, Fig. 3.

Fig. 7 is a transverse section taken on line 7—7, Fig. 3, the endless sizing member being omitted.

Fig. 8 is a longitudinal section taken on line 8—8, Fig. 4, looking in the direction of the arrow crossing said line.

Fig. 9 is an enlarged section taken on line 9—9, Fig. 8.

Fig. 10 is an enlarged section taken on line 10—10, Fig. 8.

Fig. 11 is a side elevation of a portion of the machine, showing the adjusting means for supporting the lifter bar, whereby the sizing elements are rendered non-rotatable.

Fig. 12 is a detached perspective view of one of the cam-like chain tighteners.

Fig. 13 is a sectional perspective view of the delivery shelf or chute for the final delivery of the largest size fruit from the sizing mechanism.

Fig. 14 is a transverse section taken on line 14—14, Fig. 3.

Fig. 15 is a transverse section taken on line 15—15, Fig. 3.

Fig. 16 is a detached perspective view of one of the fruit releasing elements.

Fig. 17 is a cross section taken on line 17—17, Fig. 16.

Fig. 18 is a detached perspective view of a portion of one of the carrier chains, showing one of the stub axles for the sizing elements serving as a pivot between adjacent links of said chain.

Fig. 19 is an enlarged section taken on line 19—19, Fig. 1.

Fig. 20 is a detached perspective view of one of the sections of the fruit guard.

Fig. 21 is a detached perspective view of one of the brackets detachably supporting the cross bar in which the fruit-retainer saddles are mounted.

Fig. 22 is a section taken on line 22—22, Fig. 8.

Fig. 23 is a vertical longitudinal section taken through one of the fruit-retainer saddles.

Fig. 24 is a plan view of one of said saddles.

Fig. 25 is an inverted view of one of said saddles.

Fig. 26 is a detached perspective view of a portion of the fruit retarder serving to maintain a single layer of fruit on the endless sizing member.

Fig. 27 is a side view of a part of a sizing machine frame as assembled, when using a fruit feeding unit and a plurality of sizing units.

Fig. 28 is a side view of the remaining part of said frame.

Figure 1:
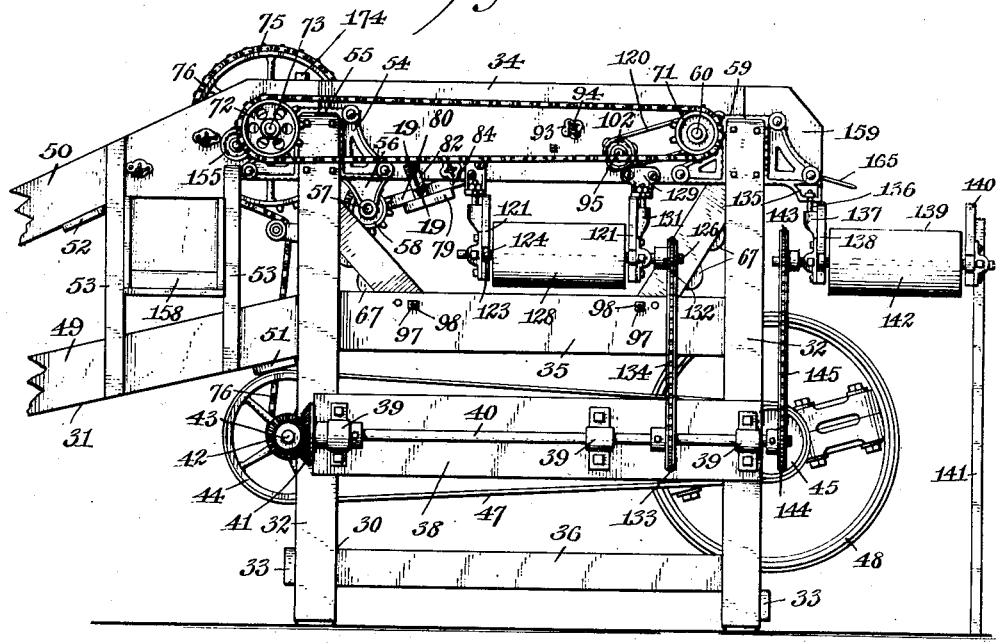
Fig. 1 is a side elevation of a single sizing unit, adapted for use as a complete sizing machine, or in connection with other similar sizing units, and having feeding mechanism associated therewith, said feeding mechanism being detachable from the sizing unit to permit other sizing units to be placed between the sizing unit shown and the feeding mechanism detachably connected therewith.

Reference being had to the drawings in detail, the numeral 30 designates the frame of the sizing portion of the machine, shown in Figs. 1 to 26 as a single sizing unit, and in Figs. 26 and 27, as consisting of a plurality of sizing units. 31 designates the frame of the feeding mechanism, a portion only of which is shown in Figs. 1, 2, 3 and 8 in connection with a sizing unit. The feeding mechanism is in the form of an elevator or conveyer and it is detachably connected to the feeding or front end of the sizing unit, or the first of a plurality of units, as the case may be.

The frame of each sizing unit comprises uprights 32 disposed at the four corners of the frame, cross members 33 transversely connecting said uprights together, and longitudinal members 34, 35, 36; the longitudinal members 34 being in the form of flat boards or frame-sides connecting the upper ends of the uprights 32 together at the same side of the machine, and these boards or sides support the upper portion of the fruit carrier or sizing strand and associated parts of the sizing mechanism, as will appear hereinafter. The uprights at two of the four corners of each sizing unit, form a permanent part of an adjacent unit, but obviously serve to support the adjacent end of an adjoining unit.

The longitudinal members 35 have inwardly-directed flanges 37 along their lower marginal portions which serve as tracks and support the lower portion or stretch of the sizing strand or member. The longitudinal members 34 and 35, in addition to serving the purposes mentioned, also tie the uprights 32 rigidly together in a longitudinal direction, and the longitudinal members 36 serve solely for such purpose.

The uprights 32 at one side of the frame are also connected together by a longitudinal bracket-supporting member 38, to which bearing brackets 39 are secured; said bearing brackets being spaced apart and having a longitudinal shaft 40 journaled therein. This shaft is driven from one end thereof, and for this purpose has a bevel gear 41 at such end meshing with a bevel gear 42 on a transverse shaft 43 journaled in suitable bearings fastened to the uprights 32 at the front or receiving end of the sizing units.

Mounted on the shaft 43 is a belt pulley 44, around which and a pulley 45 secured to the main or drive shaft 46, a belt 47 is arranged; said main or drive shaft being transversely disposed at the rear or delivery end of the sizing unit.

48 designates the drive pulley, which is secured to the drive shaft 46 and around which a suitable driving belt (not shown) is passed; said driving belt being driven from any suitable source of power.

The rear or upper end of the frame 31 of the feeding mechanism is connected to the uprights 32 at the front or receiving end of the sizing unit, as the first of a plurality of sizing units, and it comprises two longitudinally-disposed boards or members 49 which incline downwardly from the adjacent ends of the longitudinal members 35 of said sizing unit and abut against said ends, and two boards or members 50 inclined downwardly from the adjacent ends of the longitudinal members 34 of said unit; the boards or members 50 being inclined downwardly at a greater angle than the boards 49 so as to meet or closely approach each other at a distance from the sizing unit, or the first of a plurality of sizing units, as shown in Fig. 26. These boards or members 50 abut the adjacent ends of the longitudinal members 34. The abutting ends of the longitudinal members 35 and the boards or members 49 are bolted to the uprights 32 at the front or feeding end of said sizing unit, and they are transversely connected by a cross member 51. The boards or members 50 of the frame of the feeding mechanism, or the feeder frame as it may be termed, are also transversely-connected by a cross member 52 and the boards or members 49 and 50 are connected together by spaced struts 53.

The adjacent ends of the boards 50 of the frame of the feeding-mechanism, or of the feeder frame as it may be termed, and the longitudinal members 34 of the first sizing unit; also the longitudinal members 34 of adjacent sizing units are connected together by connector castings 54 in which pockets 55 are formed to receive the upper ends of the adjacent uprights 32. Said uprights are permanently bolted or otherwise permanently fastened to said castings and the castings permanently fastened to either the boards 50 or the longitudinal members 34 and adapted to be detachably secured to the other. Formed integrally with the connector castings 54, are bearing brackets 56 in which a shaft 57 is journaled which has sprocket wheels 58 secured thereto at the inner sides of and adjacent to the longitudinal members 34.

Positioned between the outer sides of the longitudinal members 34 and the uprights 32 at the rear or delivery end of the sizing unit, or the last sizing unit, are connector castings 59 which receive the upper ends of said rear uprights 32 and connect said members 34 with said uprights and with short end pieces or boards to be hereinafter described; said connector castings 59 having pockets 55 similar to the connector castings 54 and for the same purpose.

60 is a shaft which is passed through said longitudinal members and journaled in said connector castings, as at 61, Fig. 14. On this shaft 60, at the inner sides of and adjacent to the longitudinal members 34, sprocket wheels 62 are secured; these sprocket wheels being alined with the sprocket wheels 58 on the shaft 57 at the front or receiving end of the sizing unit. The sprocket wheels 58 and 62 are therefore arranged in pairs, one of each pair being on each of the shafts 57 and 60.

Figure 2:
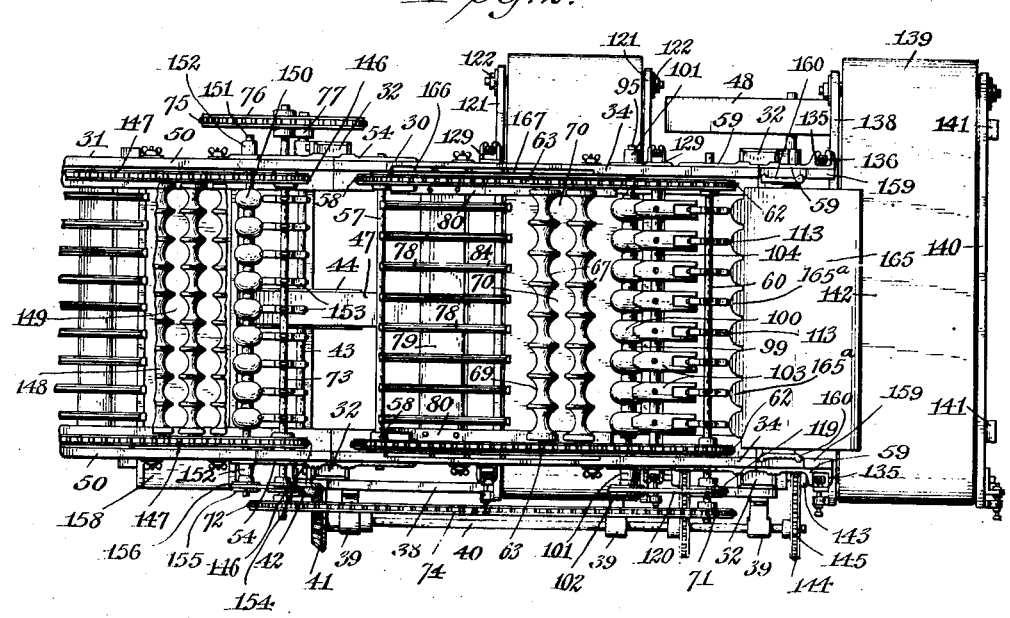
Fig. 2 is a plan view of the sizing machine or unit and the feeding mechanism detachably connected thereto, some of the feeding and cull-separating elements of the feeding mechanism and some of the sizing elements of the sizing mechanism or unit being omitted to better illustrate parts beneath.

Trained over the two pairs of sprocket wheels are sprocket or carrier chains 63, which form part of the sizing member. These chains are preferably constructed as shown in Fig. 18, and comprise double links 64 and single link 65 pivotally connecting said double links. The upper and lower stretches of these chains are parallel while the end portions converge downwardly; this arrangement being especially desirable in connection with the novel means for holding the chains taut, as will appear hereinafter. At regular intervals along these chains the pivots connecting the links thereof are extended inwardly and serve as stud axles 66 on which are rotatably mounted opposite ends of sizing elements, preferably in the form of rollers 67. Each sizing roller has at opposite ends thereof, metallic bushings 68 in which the stub shafts 66 extend. These sizing rollers are circumferentially grooved, as at 69, the grooves of all rollers being longitudinally alined with respect to the sizing unit. The alined grooves of adjacent sizing rollers provide substantially circular sizing openings 70 between the rollers, as best shown in Fig. 2, through which fruit of predetermined sizes is adapted to be passed, to be delivered out of the machine.

Due to the fact that the sizing rollers are carried by the sprocket or carrier chains 63, they are arranged in an endless series and caused to travel from the front or receiving end of the machine to the delivery or rear end thereof, thence downwardly, forwardly, and upwardly to the receiving point, at which the fruit is delivered to the sizing unit in a manner to be described hereinafter.

For moving the sizing member or endless series of sizing rollers along an endless course of travel, the shaft 60 has a sprocket wheel 71 secured thereto, which is longitudinally alined with a sprocket wheel 72 secured to a shaft 73 forming part of the feeding mechanism for feeding or delivering fruit onto the front or receiving end of the sizing unit; and trained over these sprocket wheels is a sprocket chain 74.

The shaft 73 also has a sprocket wheel 75 secured thereto, which is driven by a sprocket chain 76 passing around it and a sprocket wheel 77 secured to the shaft 43, the shaft 43 being rotated through the medium of the belt 47 driven from the main or drive shaft 46.

The upper stretch of sizing rollers is preferably inclined upwardly from its receiving point at the front end of the sizing unit, and underneath these rollers, from a point adjacent the shaft 57, guard bars 78 are arranged, these guard bars being transversely spaced and alined with the circumferential grooves 69 in the sizing rollers. Said guard bars are secured to supporting boards or members 79 fastened at their ends to tracks or track boards 80 secured to the inner sides of the longitudinal members 34 by means of bolts 81, or otherwise. The guard bars 78 and tracks or track boards 80 are inclined to correspond to the inclination of the upper stretch of grading rollers, and therefore the front ends of the two track or track boards project beneath the lower edges of the longitudinal members 34 and are fastened to the lower ends of adjustable brackets 82 secured to the outer sides of said longitudinal members 34, as at 83, Fig. 1.

As stated, the guard bars are transversely spaced to conform to the spacing of the grooves in the sizing rollers or, as it may be stated, to the sizing openings in the upper stretch of the sizing member, and they are also made in two sections 84, 85, one readily detachable from the other and from the machine, as best shown in Fig. 3, the section 85, when used being disposed beneath the otherwise effective sizing region of the sizing element.

It may here be stated that the grading machine shown and described in Figs. 1, 2 and 3 is a complete machine having a single grading unit, but such unit is adapted for use with other similar units, as shown in Figs. 26 and 27 and as will be more particularly set out hereinafter.

The section 84, which is beneath the front portion of the inclined upper stretch of the sizing member, owing to its connection to the longitudinal members 34 and the brackets 82, is a permanent part of the machine, while the section 85 is adapted for use in connection with the section 84, or may be removed from the machine, depending on the conditions of operation and also upon the number of sizing units employed, or the number of sizes into which the fruit is to be separated or graded.

In order to render the section 85 readily detachable from the machine, hangers 86 are secured to the under sides of the tracks or track boards 80 at their elevated or rear ends; these hangers being in the form of Z-bars arranged to provide receiving pockets 87 between the under sides of said tracks or track boards and the free ends of said hangers, into which pockets the ends of the supporting bars 79 of the rear section 85 is placed, thus supporting the rear end of said section. To support its front end, the guard bars 78 thereof are provided with tenons 88 which are adapted to be entered in correspondingly formed grooves or mortises 89 in the rear ends of the guard bars 79 of the section 84. When thus connected, the guard bars 79 of section 85 serve as continuations of the guard bars of section 84.

Above the tracks or track boards 80, adjustable lifter bars 90 are secured; these being spaced from the tracks or track boards and arranged parallel therewith. To render them adjustable, they are held in place by bolts 91 passed therethrough from the inner side and extending through slots 92 at right angles to the length thereof formed both in the longitudinal members 34 and in castings or wear-plates 93 fastened to the outer sides of said longitudinal members, said bolts 91 having thumb nuts 94 threaded onto their outer projecting ends and bearing against said castings or wear-plates, as clearly shown in Fig. 10.

When the lifter bars 90 are lowered to the position shown in Fig. 9, the terminals of the sizing rollers forming the upper or sizing stretch of the sizing member travel in contact with the tracks or track boards 80, which tracks or track boards may also be referred to as guides for the sizing rollers, and at such times the sprocket or carrier chains 63 will travel above and in spaced relation to said lifter bars. When, however, it is desired to have the sizing rolls travel without rotating, for a purpose to be explained hereinafter, the lifter bars will be elevated to the position shown in Fig. 10, and under such conditions these lifter bars engage and lift the sprocket or carrier chains 63, causing them to travel in contact with said lifter bars when the sizing member is under movement; the extent of elevation of said sprocket chains being sufficient to move the sizing rollers out of contact with the tracks or guides 80, thus causing the rollers to move upwardly and rearwardly along their course of travel without coming in contact with the tracks 80, the friction of which otherwise causes rotation of said rollers.

For the purpose of keeping the depending portion of the series of sizing rollers and their sprocket or carrier chains 63 in taut condition, curbed presser or cam levers 96 are provided which are secured to the inner sides of the longitudinal members 35 at opposite sides of the machine, in line with the two endless sprocket or carrier chains 63. These presser or cam levers are pivotally secured to the longitudinal members 35 by means of bolts 97 which, when tightened against the inner sides of said longitudinal members, maintain the chains 63 in taut condition, and for this purpose nuts 98 are secured to the bolts and bear against washers in contact with the outer sides of said longitudinal members. The longitudinal members 34 and 35 may be said to constitute the sides of the frame between which the sizing mechanism is positioned.

Rotatably mounted between the longitudinal members 34, Figs. 3 and 6, near the rear or delivery end of the sizing mechanism, is a fruit lifting and retaining roller 99, which has spaced circumferential beads or projections 100 formed thereon conforming in contour to but being somewhat smaller than the circumferential grooves 69 in the sizing rollers. Said circumferential beads or projections are alined with the grooves of said sizing rollers so that the grooves of said rollers receive said beads or projections when the sizing rollers travel past the same. This fruit lifting and retaining roller has its shaft 95 extending through the longitudinal members 34 and journaled in metallic bearings 101 secured to the outer sides of said longitudinal members, said shaft having a belt pulley 102 secured to one end thereof.

Adjacent to said fruit lifting and retaining roller 99 is a series of fruit-retainer saddles 103, which are mounted on a cross bar 104 having its ends entered in pockets 105 formed in brackets 106 secured to the inner sides of the longitudinal members 34, said brackets having flanges 107 provided with bolt slots 108 through which and said longitudinal members 34, bolts 109 are passed, see Fig. 22. When tightened, these bolts hold said brackets in any adjusted position within the range of the length of said bolt slots, thus positioning the upper faces of the fruit-retainer saddles in desired position with relation to the sizing openings 70. These fruit-retainer saddles are in the form of castings having a body portion 110 of substantially U-formation in cross section, and within the U-formed body portion are two spaced depending members 111 which are adapted to lie against opposite sides of the cross bar 104, the edges of the body portion 110 between said depending members 111 bearing against the upper edge of the cross bar. These saddles are fastened to the cross bar by means of screws 112 passed through openings in the crowns or crests of the saddles and entered into the cross bar from the top, as best shown in Fig. 3.

Loosely mounted on the shaft 60 between the sprocket wheels 62 are fruit-releasing elements 113 which are normally alined with the circumferential grooves 69 in the sizing rollers and have a plurality of arms 114 adapted to successively enter the sizing openings between the rollers as such openings are brought over said shaft. In the drawings I have shown four such arms formed by crossing two short bars disposed at right angles to each other and notched one into the other, as at 115. These bars are secured together by means of pins 116, or otherwise, and at their ends have leather, felt, or other pads 117 nailed, glued, or otherwise fastened thereto. These fruit-releasing elements are rotated intermittently by the sizing rollers, the arms 114 thereof being entered successively into the sizing openings 70 as the sizing rollers pass over the fruit-releasing elements. These fruit-releasing elements are therefore not positively driven; and as they are loosely mounted on the shaft 60 they have freedom of movement lengthwise on the shaft and limited freedom of movement rotatively to accommodate themselves to varying conditions arising during operation of the machine. As is clearly shown in Fig. 3, there is play rotatively for these elements without being engaged with both of adjacent sizing rollers, and by reason of this the rotation of these releasing elements is not synchronous with the movement of the shaft on which they are mounted. In fact, as stated, the rotative movement of these elements is somewhat irregular or intermittent by reason of such play, and the advantage of such an arrangement is that they will not bruise fruit to the same degree that would occur were these releasing elements positively driven by reason of their being permanently secured to the shaft.

Adjacent the sprocket wheel 71 on the shaft 60 is a belt pulley 119, over which and the belt pulley 102 on the shaft of the fruit lifting and retaining roller 99, a belt 120 is passed. The shaft 60 is rotated from the shaft 73 and through the medium of the belt pulleys 119 and 102 and the belt 120 causes rotation of the fruit lifting and retaining roller 99.

Disposed transversely within and extending through the sizing mechanism, which includes the sizing rollers 67, is a laterally-discharging fruit delivery device, comprising the following parts:

Suspended from the longitudinal members 34 forming parts of the side of each sizing unit, are two spaced transverse boards 121 provided with shaft bearings 122 on their outer sides and at one end thereof. At their opposite ends, these boards are provided with longitudinal slots 123 in which shaft bearings 124 are adjustably held. Shafts 125, 126 are rotatable in said shaft bearings 122 and 124, respectively, and secured to these shafts between the boards 121 are belt pulleys 127 over which a comparatively wide fruit delivery belt 128 is arranged. For the purpose of suspending the boards, or belt frame as these boards may be termed, I secure to the longitudinal members 34 of the machine frame, suitable brackets 129, in which bolts 130 are adjustably held, said bolts being secured to castings 131 fastened to the outer sides of the boards or belt frame 121.

To one end of the shaft 124, a sprocket wheel 132 is secured, and around this sprocket wheel and a sprocket wheel 133 secured to the longitudinal shaft 40 at the side of the sizing units, a sprocket chain 134 passes.

The connector castings 59 at the rear end of the sizing unit, when one unit only is employed, or at the rear end of the last sizing unit, when a plurality of units is employed, differ from the castings 54 at the front end thereof, in that they are provided with bolt hangers 135 instead of the bearing brackets 56, and in each of these bolt hangers, a bolt 136 is adjustably secured, said bolt being fastened into a casting 137 secured to the outer side of a board 138 forming part of a laterally-discharging fruit delivering device 139. Said fruit delivery device also has a second board 140 spaced from the board 138 and supported by legs 141 resting upon the floor or other foundation on which the machine is placed. The delivery belt 142 of this fruit delivering device passes over suitable pulleys in the same manner as the belt 128, said pulleys being fastened to shafts corresponding to the shafts 125, 126, and on one of said shafts a sprocket wheel 143 is secured, around which and a sprocket wheel 144 on the shaft 40, a sprocket chain 145.

The belt 128 serves as side delivery mechanism for the graded fruit, and it is positioned transversely within the endless series of sizing rollers, while the delivery belt 141, supported as described, is employed at the end of the complete machine, whether a single or more than one sizing unit is used.

When fruit is to be separated or graded into three or more sizes, two or more sizer units are employed. The sizing machine, regardless of the number of sizing units employed, is used in connection with the feeding mechanism arranged within the feeder frame 31, or some other suitable feeding mechanism.

The connector castings 54 employed to attach the feeder frame to the sizer frame, have bearings therein for the shaft 73, which extends through the boards or members 50 adjacent the sizer frame. On this shaft are arranged sprocket wheels 146 over which endless sprocket carrier chains 147 are passed, said chains carrying feeding and cull-discharging rollers 148 supported and formed in the same manner as the sizing rollers 67 of the sizing unit or units, excepting that the circumferential grooves in the rollers 148 are somewhat narrower and form smaller sizing openings 149 between adjacent rollers.

Arranged in a plane forward of and slightly beneath the shaft 73 is a fruit lifting and retaining roller 150 similar to the fruit lifting and retaining roller 99 of the sizing mechanism; the shaft 151 of said fruit lifting and retaining roller being journaled in suitable bearings 152 secured to the outer sides of the boards 50 of the feeder frame.

On the shaft 73, fruit-releasing elements 153 are loosely mounted, the beads or projections on the fruit lifting and retaining roller 150 and the fruit releasing elements 153 being disposed with reference to the circumferential grooves in the feeding and cull-discharging rollers 148 in the same manner as the projections of the fruit lifting and retaining roller 99 and the fruit-releasing elements 113 are disposed with reference to the circumferential grooves 69 in the sizing rollers of the sizing unit or units.

On the shaft 73 between one of the side boards 50 and the sprocket wheel 72, a belt pulley 154 is secured. A belt pulley 155 is secured on the shaft 151 of the fruit lifting and retaining roller 150 in alinement with the belt pulley 154, and around these two belt pulleys a belt 156 is passed.

Suitably supported on cross member 52 connecting the side boards 50 and on one or more similar cross members (not shown) disposed in lower planes, are guard bars 157 which extend from the feeding end of the series of feeding and cull-discharging rollers to a transversely-disposed inclined chute 158 arranged between the struts 53 connecting the upper side boards 50 of the feeder frame with the lower side bars 49.

While my improved sizing unit or units may be employed with any kind of feeding mechanism, I prefer to employ the feeding mechanism shown and described, wherein provision is made for discharging small size fruit from the machine, and wherein provision is also made that the upper stretch of feeding rollers incline downwardly from the grading unit so that fruit may be placed upon the feeding mechanism at a low point, making it unnecessary to lift the fruit any distance when depositing it onto the endless feeding strand of the feeding mechanism.

In Figs. 1, 2, 3 and 8, I have shown a single sizing unit with the longitudinal members 34 and 35 extending at opposite ends over one-half the width of the uprights 32 so that the boards 49 and 50 of the feeder frame may be connected to the uprights at the front end of the sizing unit and have their ends abutting the adjacent ends of the longitudinal members 34 and 35 of the grading unit and, if desired, an additional sizing unit may be connected to the rear end of the sizing unit shown, in substantially the same manner; thus employing one pair of uprights 32 to connect adjacent ends of two sizing units together, or one end of a sizing unit or the first sizing unit of a series with the rear end of the frame of the feeding mechanism. It is, of course, to be understood that each sizing unit employed, has a laterally discharging delivery belt 128 surrounded by its endless sizing member, or series of sizing rollers, and that the laterally-discharging delivery belt 141 is employed only at the end of the machine, regardless of the number of sizing units employed. At the rear or delivery end of the sizing unit, or the last of a plurality of sizing units, when more than one is employed, short end boards 159 abut against the rear ends of the longitudinal members 34, and these are connected to said member and to the rearmost uprights 32 by the connector castings 59 located at the upper end of said last-mentioned uprights.

On the inner sides of these short end boards, at opposite sides of the unit or machine, metallic shelf or chute supports 160 are secured, the lower ends of which have spaced rearwardly-inclined flanges 161. Between the flanges of these supports, opposite ends of a delivery shelf or chute board 162 are placed. This board is inclined rearwardly to conform to the inclination of the flanges 161.

Secured to the front marginal portion of said delivery shelf or chute board is a metallic casting or stamping 163 provided with substantially semi-circular ears 164 which are adapted to project into the grooves of the sizing rollers 67 as they pass in front of the shelf or chute board, as clearly shown in Fig. 3.

The delivery shelf or chute board 162 and the metallic casting or stamping secured thereto is covered with a sheet of rubber 165, which has ears 165a formed along its front marginal portion similar to the ears 164, which they cover. The rear portion of said rubber sheet flexibly overhangs the rear edge of the shelf or board 152 and extends over the delivery belt 142.

The longitudinal members or side boards 34 are cut away at their inner sides from their upper edges downwardly, as at 166, to provide supporting ledges 167 inclined to correspond to the inclination of the upper stretch of the sizing member, and in these ledges, notches 168 are formed at intervals along the same.

A transverse supporting bar 169 has its ends lying upon the inclined supporting ledge 167, and it is provided with a rib 170 on its under side, the ends of which are entered into transversely alined notches 168 formed in said supporting ledges at opposite sides of the machine. To the rear edge of this transverse supporting bar, depending rubber strips 171 are secured, the lower ends of which are cut to semi-circular form so as to enter the circumferential grooves of the sizing rollers 67 as they pass underneath; the fruit being carried rearwardly by the sizing mechanism, causing flexing of said strips by reason of coming in contact therewith, and any fruit piled up on the sizing mechanism is retarded in its rearward movement and caused to find lodgment on some unoccupied portion of the rearwardly traveling stretch of the sizing member.

Between the delivery end of the feeding mechanism and the receiving end of the sizing unit, a guide or fruit-directing device is arranged, and where a plurality of sizing units are employed a similar guide or fruit-directing device is provided between the delivery end of each sizing unit and the receiving end of the following unit. This guide or fruit-directing device comprises an inclined board or chute 172 fastened to the side members of the fruit delivery device at the rear end thereof and extends inwardly and downwardly into the sizing unit between its side members, or such board or chute may be attached to the side members of the fruit-sizing device and extend upwardly and inwardly into the feeding unit between the side members thereof.

Associated with said board or chute is a retainer flap 173 which hangs from a cross bar 174 supported by the side members of the feeding unit at the upper edges thereof. This retainer flap is secured to said cross bar and hangs loosely from the same so as to rest upon the board or chute. Fruit passing over the crest of the feeding mechanism falls upon the board or chute, which may be padded, and is directed thereagainst by the retainer flap, the fruit passing between the board or chute and said flap and being gently delivered onto the sizing rollers of the sizing unit. Like delivery is assured by the guide and fruit-directing devices between the successive sizing units.

It will be apparent from the foregoing that the rear or delivery end of the frame of the feeding mechanism is held elevated by the uprights at the front end of the sizing unit, or the first sizing unit of a series of units; or these uprights may be considered as the uprights at the rear end of the frame of the feeding mechanism and be utilized to support the front end of the adjacent sizing unit. In other words, a single pair of uprights are employed to connect the side members of the frame of the feeding unit with the side members of the frame of the sizing unit.

It will also be apparent that when more than a single sizing unit is employed, the front end of the frame of each sizing unit utilizes the uprights at the rear end of the frame of the preceding sizing unit to support said front end and to connect the side members of the adjacent sizing units together. In such cases the final fruit-deliverying device 139 and the short end boards 159 with the interposed delivery shelf or chute board 162 are detached from the frame of the sizing unit shown in the drawings, and after connection of the succeeding units to said sizing unit, are secured in the manner shown in Fig. 3 to the final sizing unit of the series employed.

In the embodiment of my invention shown in the drawings in which a single sizing unit is employed, provision is made for sizing the fruit into two grades or sizes only, not considering the grade or size below the smallest acceptable and herein referred to as "culls".

In grading the fruit, it is delivered to the lower end of the feeding mechanism and by means of the driving mechanism described, or other similar mechanism, this fruit is carried upwardly by the upper stretch of feeding and cull-discharging rollers 148, and any fruit of smaller size than the openings formed between said rollers will enter said openings and rest upon the guard bars 157, such fruit being carried upwardly in sliding contact with the guard bars until it reaches the upper or rear ends of the latter, after which they are free to drop into the transversely-disposed inclined chute 158, from which this small size fruit or culls are discharged at one side of the machine into a barrel or other suitable receptacle. All fruit of a size larger than the openings between said feeding and cull discharging rollers, or cull grading rollers as they may be termed, is carried upwardly by said rollers, and by the latter is delivered onto the endless series of fruit sizing rollers arranged within the adjacent sizing unit. Any fruit, however, that happens to be of a size to enter or partly enter the openings between the feeding and cull grading rollers and be lodged in such openings, will be loosened from between such rollers and be retained in loosened condition by the fruit lifting and retaining roller 150, and directly in rear of said last-mentioned roller such fruit will be released by the fruit-releasing elements 153, the padded ends of which will come in contact with such fruit and avoid bruising or otherwise injuring the same. The fruit so released is therefore carried over the crest of the delivery mechanism and delivered with the fruit of larger size onto the sizing rollers of the sizing mechanism immediately in rear. Fruit so delivered onto the sizing mechanism is compelled to pass through the guiding or fruit-directing means interposed between the delivery mechanism and the fruit-sizing mechanism.

When a single sizing unit is employed in a sizing machine, the section of guard bars 85 is removed from the unit, and this section is generally removed from each unit when more than a single unit is employed. Consequently, an open space of considerable size is provided between the rear end of the section of guard bars 84 and the lifting and retaining roller 99.

The fruit delivered onto the upper or sizing stretch of the endless series of sizing rollers 67 is carried rearwardly by said stretch and all fruit of a size small enough to pass through the openings formed by the circumferential grooves in said rollers is supported by the guard bars of the section 84; such fruit being caused to slide along said guard bars until it reaches the rear ends of the latter, after which it drops onto the fruit delivery belt 128 and by the latter is carried transversely out of the machine and delivered into any suitable receptacle placed at the side of the machine for such purpose. All fruit of a size larger than the sizing openings between adjacent sizing rollers is carried upwardly along the sizing mechanism and delivered from the latter at the crest of such mechanism onto the delivery shelf or chute board 162, down which it rolls or slides, and is delivered onto the final delivery device 139, which carries the fruit to the side of the machine and delivers it into a suitable receptacle placed underneath the delivery end of said delivery device.

Any fruit that may lodge within the sizing openings between adjacent sizing rollers will be lifted from said sizing openings by the lifting and retainer roller 99 and be directed onto the fruit retainer saddles 103 over which such fruit is carried, and while passing over said saddles such fruit is released from the sizing opening by the fruit-releasing elements 113 so as to cause such fruit to pass freely over the crest of the sizing mechanism with the larger size fruit carried upwardly by said sizing mechanism.

The fruit traveling upwardly and rearwardly with the rollers of the feeding mechanism and the fruit reaching the sizing mechanism and traveling upwardly along the rollers of the same are turned under the rotatable movement of the rollers so that the attendant may inspect the same and remove any undesirable fruit from the machine. In traveling upwardly along the sizing mechanism, the fruit is prevented from piling up on such mechanism by the rubber strips 171, which serve as retarders to maintain a single layer of fruit on the sizing mechanism at all times.

It may be here stated that where a plurality of sizing mechanisms are employed, the receiving end of each sizing mechanism is in a plane beneath the delivery end of the preceding sizing mechanism, and the fruit is therefore delivered from a high point of one sizing mechanism to a lower point of a succeeding sizing mechanism, and to prevent damage to the fruit in its course of travel from one sizing mechanism to a succeeding sizing mechanism, it is caused to pass through guide or fruit-directing means, such as shown in the drawings between the fruit feeding mechanism and the fruit-sizing mechanism.

Where a plurality of sizing units are employed, they are invariably provided with rollers having sizing openings, which will successively grade fruit according to predetermined sizes. For example, the first sizing unit may have rollers forming sizing openings to grade out fruit of a three inch size, and the succeeding sizing units, openings increasing one-fourth inch in size so that the fruit is graded into lots with the fruit of each lot one-fourth inch larger than the preceding lot. Fruit sized for foreign shipment, oftentimes vary one-half inch in size between grades or lots, and when sizing such fruit, the alternate sizing mechanisms will have the sections of guard bars 85 connected to the rear ends of the sections 84, so that the space between the upper stretch of grading rollers and the belt 128 of the delivery device is closed, causing the fruit to pass through such sizing unit without being sized by the same. The sizing mechanism in such case is merely used as a transferring or conveying mechanism to convey the fruit from the preceding unit of the machine to the succeeding unit thereof, and at such times, the lifter bars 90 are elevated to engage the undersides of the sprocket or carrier chains 63, which results in the sizing rollers being lifted out of contact with the tracks or guides 80. The sizing rollers are consequently caused to travel in an endless course without rotating, and they thus prevent the turning over of the fruit carried forwardly thereby; thus eliminating any tendency to pinch or bruise the fruit, which is carried along on the top of the series of sizing rollers, and fruit small enough to pass into the spaces between the rollers is moved along the upper edges of the guard bars 78 and 79 of the two guard sections 84 and 85, respectively, with the result, that under such conditions, the sizing unit serves as a conveyer only. It will therefore be apparent that the section of guard bars 85 is employed only when the sizing unit is utilized as a conveyer and not for the purpose of sizing fruit. This makes it unnecessary to disassemble the units of a machine and enables the units equipped with the removable section of guard bars 85 to serve as a sizing unit at any time necessary, by removing the section of guard bars 85 therefrom.

Having thus described my invention, what I claim is:—

1. Sizing mechanism, comprising an endless series of sizing rollers having fruit sizing openings between adjacent rollers, and guard means formed of separable sections associated with said series of sizing rollers and serving to cause the fruit to be carried along with said sizing mechanism without being sized thereby.

2. Sizing mechanism, comprising an endless series of sizing rollers having fruit sizing openings between adjacent rollers, and sectional guard means associated with said series of sizing rollers serving to cause the fruit to be carried along with said sizing mechanism without being sized thereby and upon removal of one of the sections of said guard means causing fruit of a given size to be sized through said sizing openings and the remaining fruit to be carried beyond said sizing mechanism.

3. Sizing mechanism, comprising an endless series of sizing rollers having circumferential grooves forming definitely sized sizing openings between adjacent rollers, delivery mechanism extending at a right angle to the direction of travel of said endless series of rollers, and guard bars associated with said series of sizing rollers and extending into the circumferential grooves of the latter to prevent fruit passing through said sizing openings until carried by said sizing mechanism beyond said guard bars.

4. Sizing mechanism, comprising an endless series of sizing rollers having circumferential grooves formed therein to provide sizing openings between adjacent rollers and having also an upper sizing stretch through the sizing openings of which fruit of a given size is adapted to pass and over which fruit larger than said given size is adapted to travel, guard means underneath a portion of said stretch of rollers having parts projecting into the grooves of said rollers to prevent fruit of said given size passing through said stretch of sizing rollers, and a delivery device beyond said guard means to which fruit of said given size is to be delivered by said stretch of rollers within a region beyond said guard means.

5. Sizing mechanism, comprising an endless series of sizing rollers having a straight-line sizing stretch and being provided between adjacent rollers with sizing openings, tracks on which said rollers travel to cause rotation thereof, and means to cause said rollers to travel non-rotatably when in said sizing stretch.

6. Sizing mechanism, comprising a series of traveling rollers, tracks at opposite ends of said series of rollers in contact with which said rollers travel to cause rotation thereof, and means to lift said rollers out of contact with said tracks to cause them to travel non-rotatably.

7. Sizing mechanism, comprising an endless series of traveling rotatable rollers having sizing openings therebetween, means to cause said endless series of rollers to travel along an endless course, means at one end of said sizing mechanism to prevent fruit of a given size from passing through said sizing openings, means at the opposite end of said mechanism independent of the means causing said endless series of rollers to travel to cause release and discharge of the fruit lodged between adjacent sizing rollers, and delivery mechanism at an intermediate point to receive fruit of said given size after having passed through the sizing openings between said sizing rollers.

8. In a sizing machine, a traveling sizing member comprising a series of sizing rollers having circumferential grooves and having the grooves of adjacent rollers forming sizing openings therebetween, and a fruit lifting and retaining roller rotatably disposed adjacent said traveling series of sizing rollers and having circumferential beads alined with the circumferential grooves of said sizing rollers and adapted to enter said grooves as said sizing rollers are successively brought in passing relation to said fruit lifting and retaining roller.

9. Sizing mechanism, comprising a series of traveling rotatable sizing rollers spaced apart and having sizing openings between adjacent rollers, a device adjacent said series of sizing rollers for lifting and retaining fruit in lifted position that may have lodged within said sizing openings, a transverse series of fruit releasing elements spaced from said lifting and retaining device, and saddle members interposed between said lifting and retaining device and said fruit releasing elements adapted to have the fruit lifted by said lifting and retaining device directed onto said saddle members to be carried to said releasing elements, said releasing elements forcing the fruit out of said sizing openings to be discharged from said sizing mechanism.

10. Sizing mechanism, comprising a sizing member having a series of traveling rotatable sizing rollers, said rollers being provided with circumferential grooves arranged so that the grooves of adjacent rollers form sizing openings therebetween, a fruit lifting and retaining roller adjacent said series of sizing rollers having circumferential ribs adapted to enter the circumferential grooves of said sizing rollers as said sizing rollers travel past the same, retainer saddles in rear of said lifting and retaining rollers onto which fruit is delivered by said sizing member after being lifted and retained in lifted position by said fruit lifting and retaining roller, and fruit releasing means comprising a plurality of radial arms adapted to enter said sizing openings to lift the fruit from said openings as the sizing member carried the fruit beyond said retainer saddles.

11. In a sizing machine, a frame having side members, an endless series of traveling rollers disposed between said side members and having circumferential grooves forming sizing openings between adjacent rollers, supporting ledges on said side members having paired transversely alined notches along their upper edges, a supporting bar having its end resting on said supporting ledge and being provided with a rib on its under side extending into any pair of notches in said ledges, and transversely spaced depending flexible strips adapted for coaction with the grooves of said sizing rollers to retard the rearward movement of fruit piled on said traveling rollers.

12. Sizing mechanism, comprising an endless series of sizing rollers having fruit sizing openings between adjacent rollers, and guard means extending lengthwise of said series of rollers and removable in part from the sizing mechanism to permit the sizing of fruit along a predetermined region only of said sizing mechanism.

13. A sizing machine, comprising a frame having side members, tracks extending along said side members, lifter bars above said tracks and parallel therewith, an endless series of sizing rollers between said tracks provided with sizing openings between adjacent rollers, chains at opposite ends of said series of rollers disposed above said lifter bars and rotatably supporting said rollers, means to cause said chains to travel in an endless course, said sizing rollers traveling in contact with said tracks to cause rotation of said rollers, and means for elevating said lifter bars to engage and lift said chains and thereby move said sizing rollers out of engagement with said tracks.

14. In sizing mechanism, the combination of a series of sizing rollers having sizing openings between adjacent rollers, and fruit-releasing elements operated by said rollers adapted to enter said sizing openings to release fruit lodged within said sizing openings and permit such fruit to be delivered from said sizing mechanism, said fruit-releasing elements having limited independent rotative and transverse movement.

15. Sizing mechanism, comprising a series of traveling rotatable sizing rollers provided with circumferential grooves forming sizing openings between adjacent rollers, and a rotatable fruit lifting and retaining roller associated with said series of rollers having circumferential ribs adapted to enter the circumferential grooves of the successive sizing rollers as they pass said lifting and retaining roller.

16. In a sizing machine, a traveling sizing member having sizing openings therein, a fruit guard extending along a portion of the range of travel of said sizing member along which fruit passing freely through said sizing openings is adapted to be moved, fruit delivery mechanism adjacent said guard onto which fruit moved along said guard is delivered, and means adjacent and operated by said delivery mechanism to cause fruit lodged within said sizing openings to be pushed therefrom and carried over the machine by said sizing member.

17. In a sizing mechanism, a sizing member having sizing openings therein through which fruit smaller than a given size is adapted to pass and on which member fruit larger than said given size is carried along over said mechanism, lifting means disposed adjacent said sizing member to lift fruit lodged within said sizing openings, retaining means adjacent said lifting means to retain such fruit in lifted position while being carried along by said sizing member, and means adjacent said retaining means to completely release the fruit from the sizing openings preparatory to delivering the same therefrom.

18. In a machine of the kind described, an endless series of rollers having circumferential grooves formed along the length thereof to provide definitely sized openings between adjacent rollers, means for causing said series of rollers to travel over a given point, and a roller associated with said series of rollers and having circumferential ribs adapted to enter the circumferential grooves of the series of rollers when the latter pass in succession thereover.

19. In a machine of the kind described, and endless series of rollers having circumferential grooves along the length thereof to provide sizing openings between adjacent rollers, means to cause said rollers to travel over a given point, a shaft disposed parallel with said rollers at said given point, and a plurality of loosely mounted elements normally spaced on said shaft in line with said sizing openings and having radial arms adapted to extend into said sizing openings as said rollers successively pass said given point.

20. In a fruit-sizing machine, the combination of a series of sizing rollers having circumferential grooves therein, and means to cause said rollers to travel over a given point, a supporting bar disposed at said given point parallel with said rollers, and fruit-retainer saddles mounted on said bar in spaced relation and in alinement with the circumferential grooves in said sizing rollers.

21. In a fruit-sizing machine, the combination of a series of traveling rollers having circumferential grooves therein to provide sizing openings between adjacent rollers, a transverse bar disposed adjacent said series of rollers and arranged parallel therewith, retainer saddles mounted in spaced relation on said transverse bar and in alinement with the circumferential grooves in said rollers to cause said saddles to enter said grooves when said rollers pass over the same, said retainer saddles having openings therethrough, a shaft parallel with said transverse bar and in spaced relation thereto, and fruit-retaining elements alined with said retainer saddles and having radial arms adapted to pass through the openings of said saddles and to enter the sizing openings between adjacent rollers.

22. A fruit sizing machine, comprisng a frame having spaced side members, a series of traveling sizing rollers between said side members having circumferential grooves forming sizing openings therebetween, a supporting bar between said side members parallel with said sizing rollers, brackets adjustably secured to said side members and having pockets therein into which the ends of said supporting bar are fitted, saddles on said supporting bar alined with the circumferential grooves in said sizing rollers and into which grooves said saddles are entered as said rollers pass over the same.

23. A sizing machine, comprising a frame having two side members, an endless series of traveling sizing rollers disposed between said side members, a fruit guard disposed underneath a portion of said series of sizing rollers and comprising a transverse supporting board, brackets secured to the ends of said supporting board and adjustably fastened to said side members, and spaced guard bars fastened to said supporting board and arranged parallel with said side members.

24. A sizing machine, comprising a frame having two side members, an endless series of traveling sizing rollers disposed between said side members, a fruit guard disposed underneath a portion of said series of sizing rollers and comprising two sections, one of said sections having a transverse supporting board, brackets secured to the ends of said supporting board and adjustably fastened to said side members and spaced guard bars fastened to said supporting board and having corresponding ends mortised, the second section comprising a transverse supporting board and spaced guard bars on said supporting board provided with tenons at corresponding ends adapted to fit the mortised ends of said first-mentioned guard bars, and hangers on said side members adapted to removably receive said last-mentioned supporting board.

25. A sizing machine, comprising a frame having side members, an endless series of traveling sizing rollers disposed between said side members and having circumferential grooves to form sizing openings between adjacent rollers, a delivery shelf in rear of said series of sizing rollers including a board supported at opposite ends by said side members, the metallic castings applied to the front edge of said board and having forwardly-projecting ears conforming to the circumferential grooves in said sizing rollers and into which grooves said ears are adapted to enter as said rollers successively pass the same, and a flexible member covering said board and said metallic casting and having ears conforming to the ears of said casting and adapted to cover the same and a rearwardly-projecting portion extending a distance beyond the rear edge of said board and loosely overhanging the same.

In testimony whereof, I affix my signature.

GEORGE S. HELENBOLT.